Sept. 12, 1950     A. I. ROMAN     2,521,806
DIFFERENTIAL PROPELLER CONTROL
Original Filed Feb. 12, 1943
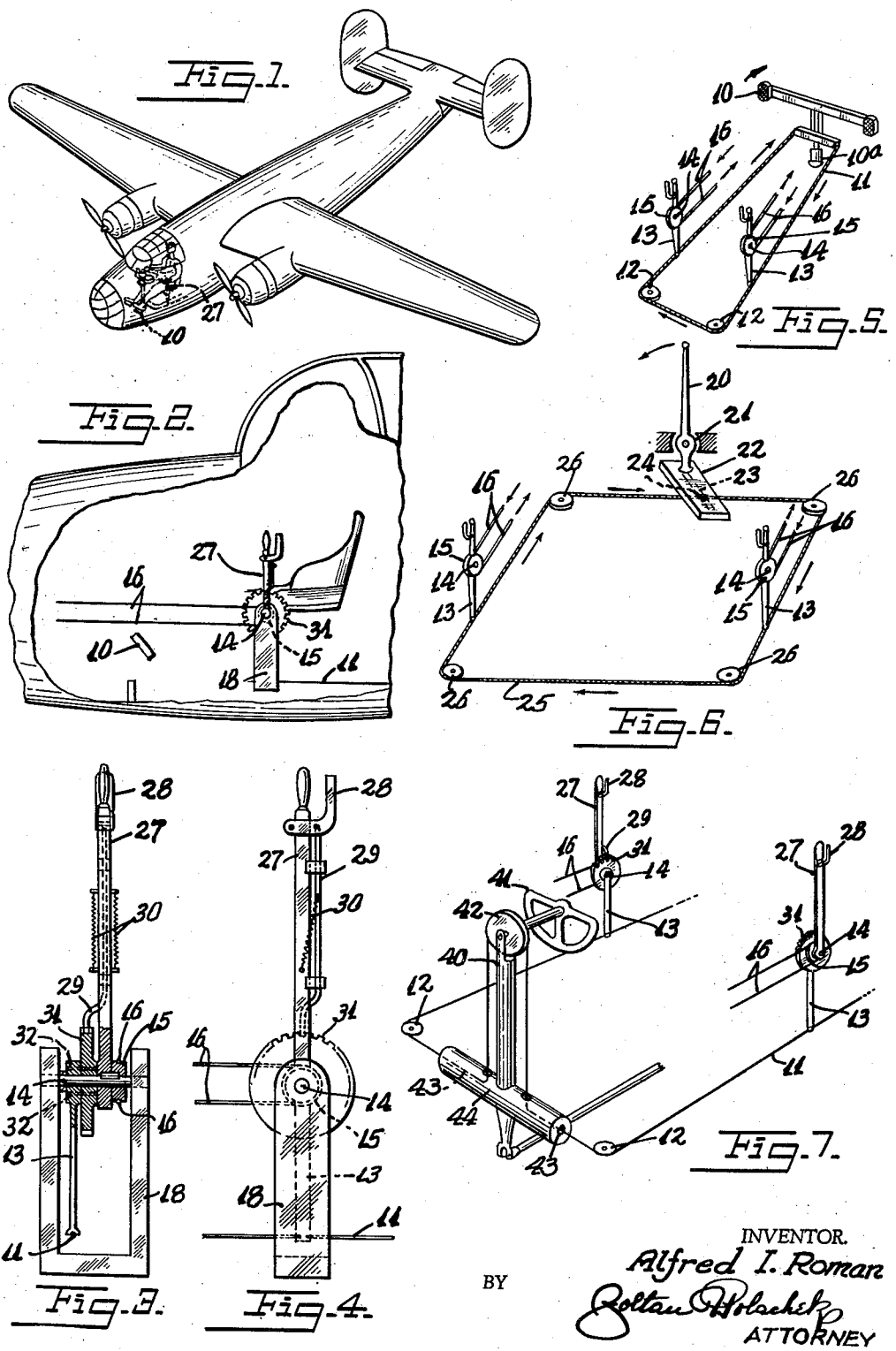
INVENTOR.
Alfred I. Roman
BY Zoltan Holachek
ATTORNEY Patented Sept. 12, 1950

2,521,806

UNITED STATES PATENT OFFICE 2,521,806

DIFFERENTIAL PROPELLER CONTROL

Alfred I. Roman, New York, N. Y.

Substituted for application Serial No. 475,620, February 12, 1943. This application October 2, 1946, Serial No. 700,703

5 Claims. (Cl. 74—479)

This invention relates to new and useful improvements in an aircraft control by means of differentially controlled propellers.

This is a substitute for my abandoned application, filed on February 12, 1943, Serial Number 475,620.

More specifically, the invention proposes a method of controlling the thrusts of two or more propellers differentially. This control is adapted to act upon the propellers by changing their pitch angles or by controlling the speeds of the engines driving the propellers.

It is the object of this invention to control an airplane or dirigible, having two or more propellers, about its vertical and longitudinal axes or angle of direction and roll, by means of differential control of the propeller thrusts.

The control in accordance with this invention, should be useful for ships of all sizes. In a tailless airplane, it might take the place of a rudder, or in a very large transport or bomber the rudder area could be reduced to a minimum and save weight and reduce the drag.

If the control is used in conjunction with an ordinary rudder, the ailerons might be eliminated and the entire span of the wing made available for flaps, thus reducing the landing speed or increasing the top speed for the same landing speed. It might also be used in place of the rudder and ailerons to provide a single control for turning and banking.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 illustrates an airplane having the control means in accordance with this invention.

Fig. 2 is a fragmentary enlarged detailed view of a portion of Fig. 1 showing particularly a portion of the control means.

Fig. 3 is an end elevational view of a portion of Fig. 2 with certain parts broken away to disclose interior construction.

Fig. 4 is a fragmentary enlarged detail view of a portion of Fig. 2.

Fig. 5 is a schematic view of the control means to illustrate one method of connecting the differential control with the rudder pedals.

Fig. 6 is another schematic view illustrating a method of connecting the differential control with the control stick of an airplane.

Fig. 7 is another schematic view illustrating a still further application of the control means.

The aircraft control, in accordance with this invention, is to be used in connection with fixed pitch propellers, adjustable pitch propellers or constant speed propellers of either the electric, hydraulic or mechanical type.

In one application of my invention, the control could be connected with the control stick or wheel of the airplane for changing the angular pitch of the right and left propellers. An airplane so equipped could be banked into a left turn by moving the control to the left automatically increasing the pitch angle of the right propeller while decreasing the pitch angle of the left propeller. This would result in an unequal thrust, forming a couple that would tend to bank the airplane to the left.

If desired, this control could be applied by connecting the control stick or wheel with the engine throttles, to change the speed of rotation of the engines and thus produce the desired couple which would tend to bank the ship. By this method, in making a left bank, the speed of the right engine would be increased while the speed of the left engine would be decreased.

Because of the higher thrust of the propeller on the outside of the turn, or the one farthest from the center of the turn, the wing on that side will develop a greater lift, resulting in a bank that would assist the turn.

If the manufacturer finds it cheaper or more advantageous to do so, this device could be manually operated by suitable controls within reach of the pilot, or other member of the crew operating the airplane.

Control of the engine speeds or the propeller thrusts could be made to coincide with the movements of the rudder of the airplane by connecting the control with the rudder pedals.

If the control is used in place of the rudder, the pilot, in operating the craft to maneuver a left turn, would cause the right propeller to rotate at a higher pitch angle than the left propeller, if both propellers are held at the same speed of rotation. If they are held at the same pitch angle, or are fixed pitch, the throttle of the right engine could be opened to increase its speed of rotation, while the throttle of the left engine is partially closed to reduce its speed.

This movement would cause unequal thrusts to be developed, resulting in two couples. One couple would tend to steer the airplane to the left, while the other couple would tend to raise the right wing, while lowering the left wing, to assist in properly banking the turn.

This produces a great advantage over the conventional aileron control which produces adverse turning or yawing movements because of the greater drag of the depressed aileron on the outside of the turn.

If desired, an airplane could be constructed without rudder pedals, in which all steering control could be vested in the control stick or wheel, which would be arranged to control turning and banking simultaneously. This would be a step towards the simplification of airplane control making solo flying possible for anyone who can drive a car.

My principle of control would be particularly effective for fighting planes, where it is desired to have a low wing area to reduce drag. In airplane construction, the smaller the wing area, the less maneuverable the plane is, requiring turns of greater radius. But, with a control of my design, the maneuverability of a plane having a minimum of wing area would be greatly increased.

A directional or rolling control in accordance with my invention could also be applied to a single engine craft employing two airscrews rotating in opposite directions on concentric shafts. By increasing the pitch angle of one screw and reducing the pitch angle of the other screw, the former would absorb greater torque than the latter screw. The torque reaction of the screw operating at the increased pitch angle would be greater than the torque reaction from the screw operation at the lower pitch angle, resulting in a torque that would tend to roll the aircraft in the direction in which the screw operating at the lowered pitch angle is turning.

In Figs. 1 to 5 means is illustrated connected with the rudder pedals 10 which are pivotally supported by a bearing 10ᵃ for controlling the pitch of the propellers of an airplane. The pedals 10 are connected to a cable 11 which extends over guide pulleys 12, to be pulled in one direction or the other. The cable 11 is in turn connected with a rudder in the conventional manner to control movements thereof, only if rudder is used in conjunction with this control, otherwise said cable is not connected with the rudder. Arms 13 are pivotally supported upon pins 14 and have their bottom ends securely attached to the cable 11 to be pivoted in one direction or the other when the pedals 10 are pushed. Pulley 15 are connected with the arms 13 concentric with and when the pedals 10 are pushed. Pulleys 15 are cables 16 engaged thereover to be pulled when the arms 13 are pivoted, as will soon be described. The cables 16 are in turn connected to control devices; such as, the throttles of the engines and/or the manual control levers of the propeller pitch control mechanisms so as to vary the speed of the motors and/or the pitch of the propellers to provide an additional thrust in the direction of the turn to assist in banking the aircraft. Details of the attachment of the cables 16 to the control devices are not given on the accompanying drawings as such connections are within the ability of those skilled in the art and form no part of this invention.

The pins 14 are turnably supported in standards 18. The pulleys 15 are indirectly connected with the arms 13. Each pulley 15 is directly connected with a lever 27 which is radially mounted on the pin 14 thereof. Each lever 27 is provided with a movably mounted auxiliary handle 28 which connects with a slidably mounted control rod 29 urged downwards by the springs 30. The bottom end of the control rod 29 engages between the teeth of a wheel 31 which is freely mounted on the pin 14 and which is rigidly connected with the arm 13 by fastening elements 32.

It is pointed out that movements of the cables 11 are transmitted to move the cables 16. The relation between these cables is fixed. However, they may be manually changed. To do this, the handles 28 must be pressed to shift the rods 29 to release the wheels 31. The levers 27 may be selectively moved to move the cables 16 without disturbing the cables 11. When the handles 28 are released, the cables 11 and 16 will be indirectly locked in their new relationships.

Fig. 6 illustrates a controlling means connected with an airplane control stick 20 for varying the pitch of the propeller blades, or engine speeds. The stick 20 is universally supported at point 21 and is provided at its bottom end with a block 22 having a longitudinally extending slot 23 which connects with slider 24 fixedly attached to a cable 25. The cable 25 engages over pulleys 26 and is connected at points with the bottom ends of arms 13 pivotally supported upon pins 14. Pulleys 15 are connected with the arms 13 concentric with the pins 14 and are engaged by cables 16 which in turn are connected with the propeller pitch controlling mechanisms or engine speed controlling mechanisms not shown on the drawing as previously described relative to Figs. 1 to 5.

The construction is such that as the stick 20 is moved either to the left or the right about its supporting point 21 it similarly moves the block and pulls the cable 25 to pivot the arms and pull the cables 16 to cause an adjustment to be made to the propeller pitch controlling mechanisms which will in turn act upon the propellers, or to the engine speed mechanisms. The slot 23 and slider 24 are provided for the purpose of permitting the stick 20 to be moved forwards and rearwards to cause the plane to climb or descend without effecting the propeller pitches.

In Fig. 7 a conventional stick or control mechanism 40 is shown to include a hand wheel 41 adapted to rotate a pulley 42, engaged by the cable 11. This cable 11 passes through hollow portions 43 of the stick trunnion 44 and extend over guide pulleys 12. The cable is connected to the free end of each arm 13. In other respects, this form of the invention is similar to the previous forms and the corresponding parts may be recognized by similar reference numerals.

In making the drawings, I have avoided more detailed illustration of the manner of carrying out the application of the various forms of my invention, as there are many ways of accomplishing these results, and I did not wish to limit this specification to any one or two of these various methods.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described having a manually controllable element for moving parallel portions of a cable in opposite directions and control means connected to said parallel portions of the cable to be operated thereby when the manually controlled element is moved, each control means comprising a bracket positioned adjacent one parallel portion of the cable, a pin turnably supported by said bracket, a depending arm pivotally supported on said pin and connected at its lower end to one of the parallel portions of the cable, a wheel freely mounted on said pin and attached to the top end of said depending arm, an upstanding lever on said pin adjacent said wheel, a pulley on said pin on the opposite side of said lever, said lever and pulley being locked to said pin, a cable engaged over said pulley and means connecting said upstanding lever to said wheel so that when said arm is pivoted in one direction or the other by the parallel portion of the cable said wheel will be turned similarly turning said lever and said pulley to move said cable engaged over said pulley, said means being releasable permitting said lever, pin and pulley to be turned independently of said arm and said wheel to move said cable engaged over said pulley independently of said arm.

2. In a device of the class described having a manually controllable element for moving parallel portions of a cable in opposite directions and control means connected to said parallel portions of the cable to be operated thereby when the manually controlled element is moved, each control means comprising a bracket positioned adjacent one parallel portion of the cable, a pin turnably supported by said bracket, a depending arm pivotally supported on said pin and connected at its lower end to one of the parallel portions of the cable, a wheel freely mounted on said pin and attached to the top end of said depending arm, an upstanding lever on said pin adjacent said wheel, a pulley on said pin on the opposite side of said lever, said lever and pulley being locked to said pin, a cable engaged over said pulley, and means connecting said upstanding lever to said wheel so that when said arm is pivoted in one direction or the other by the parallel portion of the cable said wheel will be turned similarly turning said lever and said pulley to move said cable engaged over said pulley, said means being releasable permitting said lever, pin and pulley to be turned independently of said arm and said wheel to move said cable engaged over said pulley independently of said arm, and fastening elements engaged through said depending arm and wheel connecting them together.

3. In a device of the class described having a manually controllable element for moving parallel portions of a cable in opposite directions and control means connected to said parallel portions of the cable to be operated thereby when the manually controlled element is moved, each control means comprising a bracket positioned adjacent one parallel portion of the cable, a pin turnably supported by said bracket, a depending arm pivotally supported on said pin and connected at its lower end to one of the parallel portions of the cable, a wheel freely mounted on said pin and attached to the top end of said depending arm, an upstanding lever on said pin adjacent said wheel, a pulley on said pin on the opposite side of said lever, said lever and pulley being locked to said pin, a cable engaged over said pulley, and means connecting said upstanding lever to said wheel so that when said arm is pivoted in one direction or the other by the parallel portion of the cable said wheel will be turned similarly turning said lever and said pulley to move said cable engaged over said pulley, said means being releasable permitting said lever, pin and pulley to be turned independently of said arm and said wheel to move said cable engaged over said pulley independently of said arm, said connecting means comprising a rod slidable on said upstanding lever, teeth formed on the periphery of said wheel and engaged by the lower end of said rod, resilient means urging said rod into engagement with said teeth, and means facilitating movement of said rod against said resilient means to disengage said rod from said teeth.

4. In a device of the class described having a manually controllable element for moving parallel portions of a cable in opposite directions and control means connected to said parallel portions of the cable to be operated thereby when the manually controlled element is moved, each control means comprising a bracket positioned adjacent one parallel portion of the cable, a pin turnably supported by said bracket, a depending arm pivotally supported on said pin and connected at its lower end to one of the parallel portions of the cable, a wheel freely mounted on said pin and attached to the top end of said depending arm, an upstanding lever on said pin adjacent said wheel, a pulley on said pin on the opposite side of said lever, said lever and pulley being locked to said pin, a cable engaged over said pulley, and means connecting said upstanding lever to said wheel so that when said arm is pivoted in one direction or the other by the parallel portion of the cable said wheel will be turned similarly turning said lever and said pulley to move said cable engaged over said pulley, said means being releasable permitting said lever, pin and pulley to be turned independently of said arm and said wheel to move said cable engaged over said pulley independently of said arm, said connecting means comprising a rod slidable on said upstanding lever, teeth formed on the periphery of said wheel and engaged by the lower end of said rod, resilient means urging said rod into engagement with said teeth, and means facilitating movement of said rod against said resilient means to disengage said rod from said teeth, said resilient means comprises a contraction spring operating between said rod and said lever.

5. In a device of the class described having a manually controllable element for moving parallel portions of a cable in opposite directions and control means connected to said parallel portions of the cable to be operated thereby when the manually controlled element is moved, each control means comprising a bracket positioned adjacent one parallel portion of the cable, a pin turnably supported by said bracket, a depending arm pivotally supported on said pin and connected at its lower end to one of the parallel portions of the cable, a wheel freely mounted on said pin and attached to the top end of said depending arm, an upstanding lever on said pin adjacent said wheel, a pulley on said pin on the opposite side of said lever, said lever and pulley being locked to said pin, a cable engaged over said pulley, and means connecting said upstanding lever to said wheel so that when said arm is pivoted in one direction or the other by the parallel portion of the cable said wheel will be turned similarly turning said lever and said pulley to move said cable engaged over said pulley, said means being releasable permitting said lever, pin and pulley to be turned independently of said arm and said wheel to move said cable engaged over said pulley independently of said arm, said connecting means comprising a rod slidable on said upstanding lever, teeth formed on the periphery of said wheel and engaged by the lower end of said rod, resilient means urging said rod into engagement with said teeth, and means facilitating movement of said rod against said resilient means to disengage said rod from said teeth, said last-mentioned means comprises an auxiliary handle pivotally connected to the top end of said rod.

ALFRED I. ROMAN.

REFERENCES CITED

The following references are of record in the file of this patent:

UNITED STATES PATENTS

| Number | Name | Date |
|---|---|---|
| 1,092,365 | Jenkins | Apr. 7, 1914 |
| 1,109,891 | Young | Sept. 8, 1914 |
| 1,797,669 | Oehmichen | Mar. 24, 1931 |
| 1,941,616 | Mueller | Jan. 2, 1934 |
| 1,976,479 | Butler | Oct. 9, 1934 |
| 1,993,701 | Avery | Mar. 5, 1935 |
| 2,058,161 | Lewis | Oct. 20, 1936 |
| 2,079,677 | Brown | May 11, 1937 |
| 2,280,654 | Mader | Apr. 21, 1942 |
| 2,334,504 | Perina | Nov. 16, 1943 |

FOREIGN PATENTS

| Number | Country | Date |
|---|---|---|
| 483 | Great Britain | 1912 |
| 148,360 | Great Britain | July 9, 1920 |